United States Patent
Harer et al.

(10) Patent No.: US 6,644,430 B2
(45) Date of Patent: Nov. 11, 2003

(54) INTEGRAL BUSHING ASSEMBLY FOR A RACK AND PINION STEERING GEAR

(75) Inventors: Dennis F. Harer, Kingsport, TN (US); Mark A. Skelton, Mt. Carmel, TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/109,348

(22) Filed: Mar. 27, 2002

(65) Prior Publication Data

US 2003/0057010 A1 Mar. 27, 2003

Related U.S. Application Data

(63) Continuation-in-part of application No. 09/961,838, filed on Sep. 24, 2001.

(51) Int. Cl.⁷ .................................................. B62D 5/06
(52) U.S. Cl. ........................ 180/428; 180/417; 384/16; 277/586; 92/168
(58) Field of Search ................................ 180/417, 400, 180/428, 439; 277/549, 572, 585, 586; 384/15, 16; 74/422; 92/168

(56) References Cited

U.S. PATENT DOCUMENTS

| | | | |
|---|---|---|---|
| 2,862,736 A | * 12/1958 | Russell | |
| 2,915,349 A | * 12/1959 | Gomberg | |
| 3,559,540 A | * 2/1971 | Sheldon | 92/163 |
| 3,806,206 A | * 4/1974 | Tribe et al. | 303/21 F |
| 4,280,741 A | * 7/1981 | Stoll | 308/3.5 |
| 4,301,691 A | * 11/1981 | Walter | 74/422 |
| 4,369,852 A | 1/1983 | Nishikawa et al. | |
| 5,181,581 A | 1/1993 | Engler | |
| 5,285,864 A | 2/1994 | Martin et al. | |
| 5,392,875 A | * 2/1995 | Duffy | 180/132 |
| 5,709,283 A | * 1/1998 | Nief | 180/428 |
| 5,895,051 A | 4/1999 | Bowers | |
| 6,155,375 A | 12/2000 | Gierc et al. | |
| 6,176,147 B1 | 1/2001 | Ozeki | |
| 6,330,929 B1 | * 12/2001 | Gierc et al. | 180/428 |
| 6,467,566 B1 | * 10/2002 | Harer et al. | 180/417 |

* cited by examiner

Primary Examiner—Avraham Lerner
(74) Attorney, Agent, or Firm—Tarolli, Sundheim, Covell & Tummino, L.L.P.

(57) ABSTRACT

A fluid power assisted rack and pinion steering apparatus (10) for a vehicle includes a rack (40) connectable with steerable wheels of the vehicle, a housing (20) partially enclosing the rack (40) and defining a fluid chamber (39), a bushing (390 or 590) encircling the rack (40), a sleeve (420 or 620) supporting the rack (40) for sliding movement relative to the bushing (390 or 590), and a fluid tight seal member (370 or 570) for sealing the fluid chamber (39). The bushing (390 or 590) has opposite axial ends (391, 412 or 591, 612) and is secured in the housing (20) by an interference fit between an outer surface 394 or 594 of the bushing (390 or 590) and an inner surface (26) of the housing (20). The sleeve (420 or 620) extends between the bushing (390 or 590) and the rack (40). The sleeve (420 or 620) has at least one radially extending tab (431 or 631) received in a corresponding recess (418 or 618) in the bushing (390 or 590). The tab (431 or 631) provides a locating surface (441 or 641) for positioning the sleeve (420 or 620) relative to the bushing (390 or 590). The seal member (370 or 570) is located adjacent a recessed surface (394 or 594) of the bushing (390 or 590).

11 Claims, 5 Drawing Sheets

INTEGRAL BUSHING ASSEMBLY FOR A RACK AND PINION STEERING GEAR

RELATED APPLICATIONS

This application is a continuation-in-part of pending application Ser. No. 09/961,838, filed Sep. 24, 2001, and assigned to the assignee of the present invention.

TECHNICAL FIELD

The present invention relates to a rack and pinion power steering apparatus and, in particular, to a bushing assembly for a rack and pinion power steering apparatus.

BACKGROUND OF THE INVENTION

A conventional hydraulic rack and pinion power steering apparatus for a vehicle includes a rack that extends axially through a chamber inside a hydraulic cylinder, or housing. The ends of the rack project axially outward from the terminal ends of the housing and are connected with steering linkages that connect to steerable vehicle wheels.

A piston is fixed to the rack within the chamber. Rotation of the vehicle steering wheel actuates a hydraulic valve and causes hydraulic fluid under pressure to act against the piston. The force exerted by the hydraulic fluid moves the piston within the chamber, causing the rack to move axially. The axial movement of the rack moves the steering linkage that, in turn, causes the steerable vehicle wheels to turn.

To prevent hydraulic fluid from flowing out of the chamber, it is necessary to seal the ends of the chamber through which the rack projects. It is also desirable to support the rack for axial movement within the chamber without losing the integrity of the seal. A bushing assembly is typically used for this purpose. Moreover, it is known to enclose the ends of the chamber with bellows attached to the housing to prevent the ingress of moisture, dirt, or other contaminants into the housing.

A bushing structure that enables the secure connection of the bushing to a plain, unmachined end of the housing, and to the bellows, with a minimal number of separate pieces would increase service life of the bushing apparatus while decreasing assembly time and production cost.

SUMMARY OF THE INVENTION

In accordance with one feature of the present invention, a fluid power assisted rack and pinion steering apparatus for a vehicle comprises a rack connectable with steerable wheels of the vehicle, a housing partially enclosing the rack and defining a fluid chamber, a bushing encircling the rack and having opposite axial ends, a sleeve supporting the rack for sliding movement relative to the bushing, and a fluid tight seal member for sealing the fluid chamber. The rack has a longitudinal axis and is movable in opposite axial directions to turn the steerable wheels in opposite directions. The bushing is secured in the housing by an interference fit between an outer surface of the bushing and an inner surface of the housing. The sleeve is located between the bushing and the rack and engages the rack. The sleeve has at least one radially extending tab received in at least one corresponding recess in the bushing. The at least one radially extending tab axially and rotationally locates the sleeve relative to the bushing.

In accordance with another feature of the present invention, a fluid power assisted rack and pinion steering apparatus for a vehicle comprises a rack connectable with steerable wheels of the vehicle, a housing partially enclosing the rack and defining a fluid chamber, a bushing encircling the rack, a sleeve supporting the rack for sliding movement relative to the bushing, and a fluid tight seal member for sealing the fluid chamber. The rack has a longitudinal axis and is movable in opposite axial directions to turn the steerable wheels in opposite directions. The housing has at least one terminal end portion with a cylindrical inner surface having a constant inner diameter. The bushing has an outer surface engaging the inner surface of the housing. The bushing has a first end portion and a second axially opposite second end portion. The sleeve has at least one radially extending tab for receipt in at least one corresponding recess at the second end portion of the bushing. The radially extending tab both axially and rotationally secures the sleeve to the bushing. The seal member is located in a recess at the first end portion of the bushing.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 3 is a view taken along line 3—3 in FIG. 2;

DESCRIPTION OF AN EXAMPLE EMBODIMENT

Figure 1:
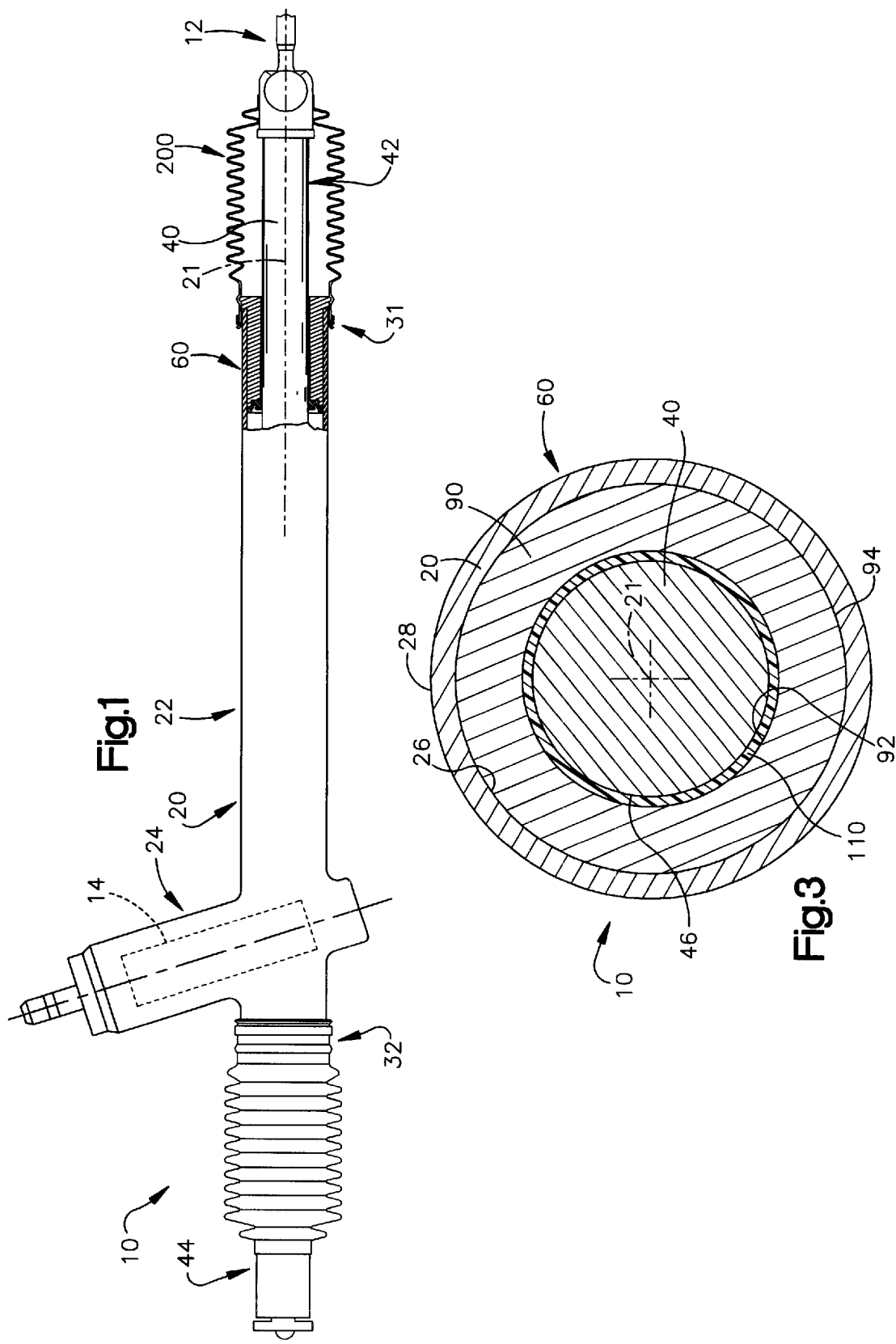
FIG. 1 is a schematic view of a rack and pinion power steering apparatus embodying the present invention.

The present invention relates to a rack and pinion power steering apparatus and, in particular, is directed to a bushing assembly for a rack and pinion power steering apparatus. The present invention, however, may be applicable to various steering apparatus constructions. As representative of the present invention, FIG. 1 illustrates a rack and pinion power steering apparatus 10. The steering apparatus 10 is connected with a pair of steerable vehicle wheels (not shown) in a known manner by steering linkage 12 at one end of the steering apparatus and by similar steering linkage (not shown) at the other end of the steering apparatus.

The steering apparatus 10 includes a housing 20 having a longitudinal axis 21, a pinion 14, a rack 40 having the same longitudinal axis as the housing, and a bushing assembly 60 in accordance with one feature of the present invention. The housing 20 includes a rack portion 22 and a transversely extending pinion portion 24. The pinion 14 is disposed in the pinion portion 24 of the housing 20 and has teeth (not shown) that meshingly engage teeth (not shown) on the rack 40 inside the housing at the intersection of the pinion portion and the rack portion 22.

Figure 2:
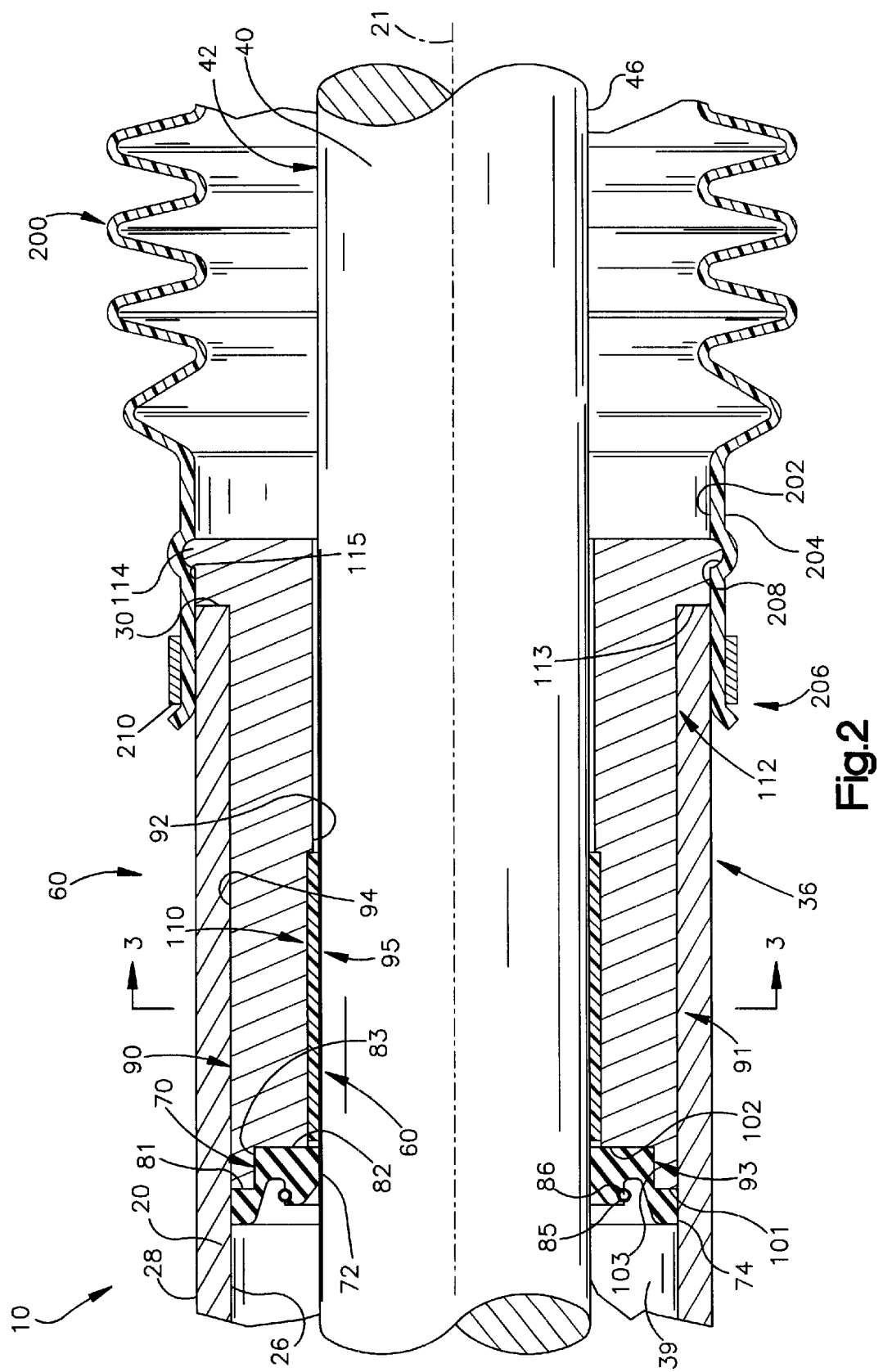
FIG. 2 is an enlarged sectional view of a portion of the power steering apparatus of FIG. 1 illustrating a bushing assembly constructed in accordance with one feature of the present invention.

As viewed in FIGS. 2 and 3, the rack portion 22 of the housing 20 has cylindrical inner and outer surfaces 26, 28, both centered about the longitudinal axis 21. The housing 20 further has a first terminal end portion 31 and a second terminal end portion 32 opposite the first terminal end portion (FIG. 1). The inner and outer surfaces 26, 28 both have constant diameters such that both surfaces define uniform cylinders at the terminal end portions 31, 32 of the housing 20. An annular end surface 30 of the housing 20 extends between the inner and outer surfaces 26, 28 at the first terminal end 31 of the housing 20. The inner surface 26 in the rack portion 22 further defines a fluid chamber 39 within the housing 20.

The rack 40 is centered on the axis 21 and extends axially through the fluid chamber 39 in the housing 20. Oppositely disposed distal ends 42, 44 (FIG. 1) of the rack 40 project axially beyond the terminal end portions 31, 32, respectively, of the housing 20 and are connected to the steering linkages (one shown). The rack 40 has a cylindrical outer surface 46 partially within the fluid chamber 39 and partially enclosed by the housing 20. The distal ends 42, 44 of the rack 40 each extend axially outward from the housing 20.

A piston (not shown) is fixed to the rack 40 inside the fluid chamber 39. Upon rotation of the vehicle steering wheel (not shown), fluid under pressure in the fluid chamber 39 acts against the piston, causing the rack 40 to move axially within the housing 20. Such axial movement of the rack 40 in opposite directions moves the steering linkages 12 in opposite directions, and thus turns the steerable vehicle wheels in opposite directions, as is known.

The bushing assembly 60 is located at the first terminal end portion 31 of the housing 20. A similar bushing assembly (not shown) may be located at the second terminal end portion 32 of the housing 20. The bushing assembly 60 encircles the rack 40 and is centered on the axis 21. The bushing assembly 60 is connected to the housing 20 and supports the rack 40 for axial movement relative to the housing. The bushing assembly 60 further seals the fluid chamber 39 against the fluid leaking out of the housing 20. The bushing assembly 60 comprises an annular seal member 70, an annular bushing 90, and a cylindrical liner, or sleeve 110.

The bushing 90 is located in the fluid chamber 39 and extends radially between the housing 20 and the sleeve 110. The bushing 90 also extends axially from the end surface 30 of the housing 20 into the fluid chamber 39 in one axial direction and outward along the distal end 42 of the rack 40 in another opposite axial direction. The bushing 90 encircles the outer surface 46 of the rack 40, but does not engage the outer surface. The bushing 90 includes cylindrical inner and outer surfaces 92, 94, respectively. Thus, the inner surface 92 of the bushing 90 does not engage, and is spaced radially from, the outer surface 46 of the rack 40.

The bushing 90 further has a first section 91 and an axially opposite second section 112. The first section 91 extends axially along the inner surface 26 of the housing 20 from the end surface 30 of the housing. The first section 91 of the bushing 90 may be secured in the housing 20 solely by an interference fit between the outer surface 94 of the bushing 90 and the inner surface 26 of the housing. The first section 91 of the bushing 90 thereby defines an axial end of the fluid chamber 39.

The interference fit allows the bushing assembly 60 to be secured to the housing 20 without the necessity of other locking features (i.e., lock wire, locking ring, crimp of the housing, etc.). Further, the terminal end portions 31, 32 of the housing 20 may be formed as plain cylindrical tube ends without the need for any further modification (i.e., machining, tapering, forming, crimping, etc.). However, the terminal end portions 31, 32 may optionally be modified to include crimping, crush pads, etc. in order to augment the connection provided by the interference fit. The interference fit is typically provided by the outside diameter of the bushing 90 being nominally about 0.2 mm larger than the inside diameter of the housing 20.

The first section 91 of the bushing 90 further defines a first recess 93 for receiving the seal member 70. The bushing 90 may be made of a metallic material, such as zinc, a zinc alloy (i.e., ZAMAK 5), a powdered metal, or cast aluminum.

The sleeve 110 is preferably press fit into a second recess 95 on the cylindrical inner surface 92 of the bushing 90 to form a single unitary part with the bushing. The sleeve 110 supports the rack 40 for sliding movement relative to the housing 20 and the bushing 90. The sleeve 110 further provides a bearing surface between the axially moving rack 40 and the relatively stationary bushing 90 thereby reducing wear between the relatively moving parts. The sleeve 110 may be made of a polymer composite material such as 35% glass-filled polyester (RYNITE brand polyester or KEVLAR/TEFLON, both available from E.I. DuPont de Nemours & Co.)

The fluid tight annular seal member 70 is attached to the first section 91 of the bushing 90 and provides a fluid tight seal for the fluid chamber 39 of the housing 20. The seal member 70 is typically made of an elastomeric material, such as VITON® or hydrogenated NITRILE®. The seal member 70 includes cylindrical inner and outer sealing surfaces 72, 74, respectively. The outer surface 74 of the seal member 70 sealingly engages the inner surface 26 of the housing 20. The inner surface 72 of the seal member 70 sealingly engages the outer surface 46 of the rack 40, which is axially movable relative to the seal member.

The seal member 70 has first, second, and third surfaces 81, 82, and 83, respectively, which abut a first annular surface 101, a second recessed annular surface 102, and a third recessed cylindrical surface 103, respectively, in the axial end of the first section 91 of the bushing 90. The seal member 70 is preferably secured to the bushing 90 by pressing the seal member into the recess 93 defined by the surfaces 101, 102, 103 in the first section 91 of the bushing.

The first surface 81 of the seal member 70 sealingly engages the first surface 101 of the bushing 90. The second surface 82 of the seal member 70 sealingly engages the second surface 102 of the bushing 90. The third surface 83 of the seal member 70 sealingly engages the third surface 103 of the bushing 90. Preferably, a small gap remains between the second surface 82 of the seal member 70 and the sleeve 110 so that the sleeve in no way imparts axial force to the seal member (i.e., during axial movement of the rack 40) and does not thereby dislodge the seal member from its position in the recess 93 of the bushing 90.

The seal member 70 may further include an annular groove 85 in which a metallic garter spring 86 is located. The garter spring 86 exerts a radially inward force on a portion of the seal member 70 to force the inner surface 72 of the seal member against the outer surface 46 of the rack 40 and maintain a fluid tight seal between the seal member and the intermittently moving rack.

The first and second sections 91, 112 of the bushing 90 are formed together as one piece, meaning that the first and second sections are made of a single homogeneous material as a single unit, rather than as separate parts that are joined together. The second section 112 of the bushing 90 projects axially beyond the end surface 30 of the housing 20. The second section 112 includes an annular surface 113 that acts as a bushing-positioning surface. The surface 113 abuts the end surface 30 of the housing 20 and thereby determines the position of the bushing 90 relative to the housing 20. The second section 112 further has a cylindrical outer surface 115 having a diameter substantially equal to the diameter of the outer surface 28 of the terminal end 31 of the housing 20. The second section 112 of the bushing 90 includes a circumferentially extending, annular retaining ridge 114 (FIG. 2). The retaining ridge 114 extends radially from the outer surface 115 and has a semi-cylindrical shape in cross-section. The retaining ridge 114 is typically formed as a single-piece with the bushing 90.

The steering apparatus 10 further includes a bellows member 200 encircling the rack 40 and enclosing the second section 112 of the bushing 90 and the distal end 42 of the rack 40. The bellows member 200 is made of a suitable flexible material such as rubber. The bellows member 200 is attached to the second section 112 of the bushing 90. The bellows member 200 has inner and outer surfaces 202, 204, respectively, and an end portion 206. Typically, a circumferentially extending groove 208 is formed in the inner surface 202 of the bellows member 200 and receives the retaining ridge 114 on the bushing 90 to assist in securing the bellows member to the bushing, and thereby the housing 20.

A ring-shaped band clamp 210 may encircle the outer surface 28 of the terminal end 31 of the housing 20. The band clamp 210 compresses the end portion 206 of the bellows member 200 against the housing 20 to assist in securing the bellows member to the bushing 90 and the housing. By attaching the bellows member 200 to the plain outer surface 28 of the housing 20 and the bushing 90 itself, the manufacture of the housing is simplified because a bellows retention feature does not have to be incorporated at the terminal end 31 of the housing. Thus, the present invention provides an integral bushing assembly 60 that seals the fluid chamber 39, supports the rack 40 for sliding movement, and securely retains the bellows member 200.

Figure 4:
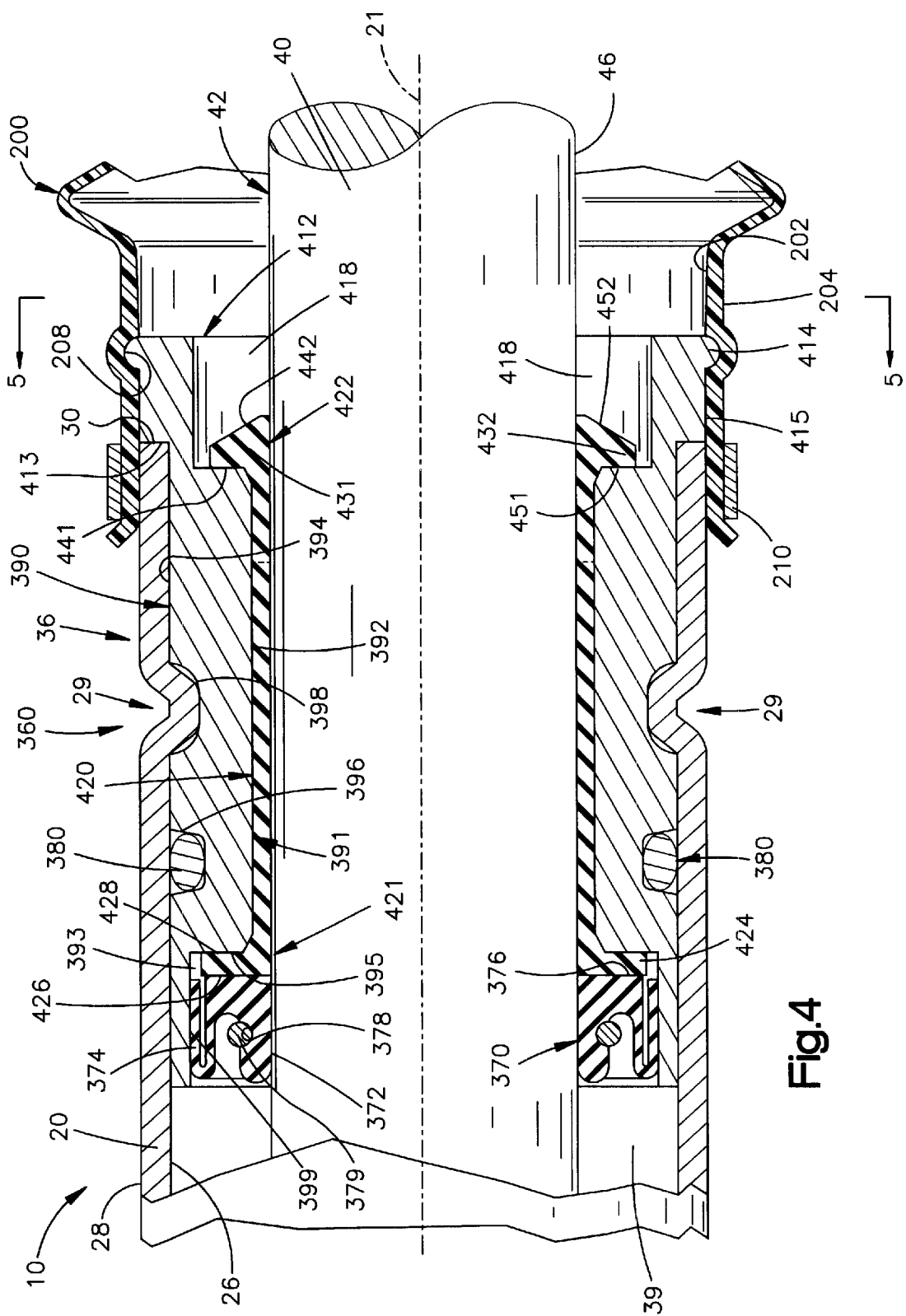
FIG. 4 is an enlarged sectional view of a portion of the power steering apparatus of FIG. 1 illustrating a bushing assembly constructed in accordance with another feature of the present invention.
Figure 5:
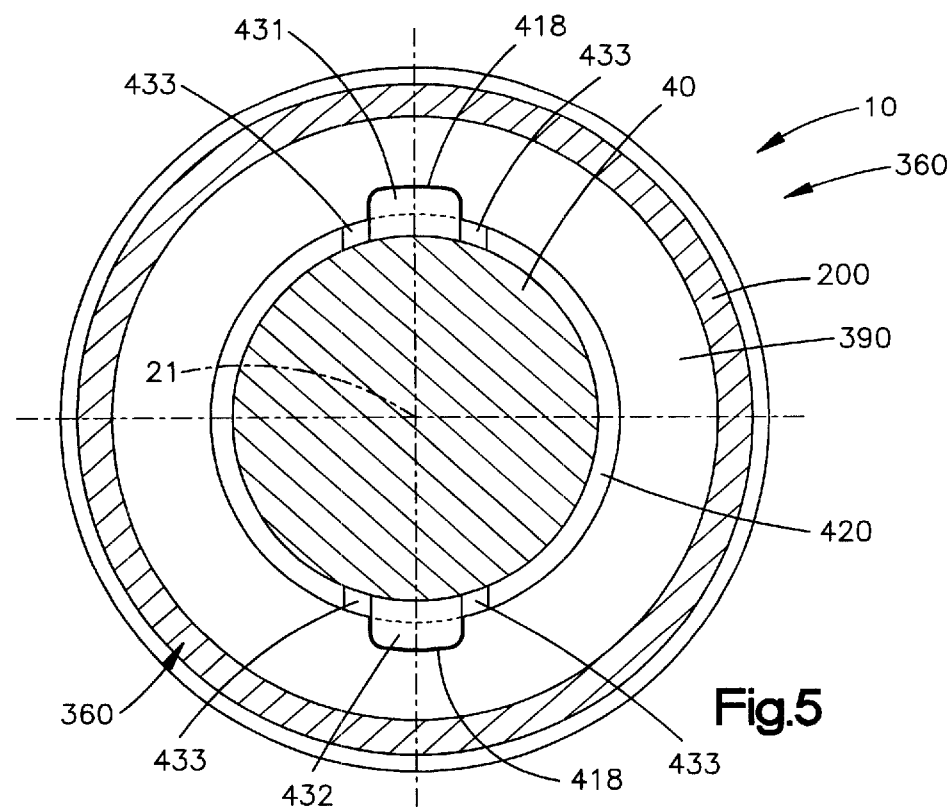
FIG. 5 is a view taken along line 5—5 in FIG. 4.

FIGS. 4 and 5 illustrate a bushing assembly 360 in accordance with another feature of the present invention. The bushing assembly 360 is located at the first terminal end 36 of the housing 20. A similar bushing assembly (not shown) may be located at the second terminal end portion 32 of the housing 20. The bushing assembly 360 encircles the rack 40 and is centered on the axis 21. The bushing assembly 360 is connected to the housing 20 and supports the rack 40 for axial movement relative to the housing. The bushing assembly 360 further seals the fluid chamber 39 against fluid leaking out of the housing 20. The bushing assembly 360 comprises a first annular seal member 370, a second annular seal member 380, an annular bushing 390, and a cylindrical liner, or sleeve 420.

The bushing 390 is located in the fluid chamber 39 and extends radially between the housing 20 and the sleeve 420. The bushing 390 may be made of a metallic material, such as zinc, a zinc alloy (i.e., ZAMAK 5), a powdered metal, or cast aluminum. The bushing 390 also extends axially from the end surface 30 of the housing 20 into the fluid chamber 39 in one axial direction and outward along the distal end 42 of the rack 40 in another opposite axial direction. The bushing 390 encircles the outer surface 46 of the rack 40, but does not engage the outer surface. The bushing 390 includes cylindrical inner and outer surfaces 392, 394, respectively. The inner surface 392 of the bushing 390 does not engage, and is spaced radially from, the outer surface 46 of the rack 40.

The bushing 390 further has a first section 391 and an axially opposite second section 412. The first section 391 extends axially along the inner surface 26 of the housing 20 from the end surface 30 of the housing. The first section 391 of the bushing 390 is secured in the housing 20 by an interference fit between the outer surface 394 of the bushing 390 and the inner surface 26 of the housing. The first section 391 of the bushing 390 defines an axial end of the fluid chamber 39.

The bushing 390 may include two annular recesses, grooves 396, 398, formed on the outer surface 394 of the bushing 390. The first groove 396 is located in the first section 391 of the bushing 390 and the second groove 398 is spaced axially from the first groove in the first section of the bushing. The grooves 396, 398 extend circumferentially around the outer periphery of the bushing 390.

The interference fit may allow the bushing assembly 360 to be secured to the housing 20 without the necessity of other locking features (i.e., lock wire, locking ring, etc.). However, as viewed in FIG. 4, the bushing assembly 360 may be supplementally secured in the housing 20 by crimping the housing 20.

The material of the housing 20 may be deformed radially inward for securing the bushing 390 in the housing. Specifically, the material of the housing 20 is crimped radially inward into the second groove 398 in the first section 391 of the bushing 390, at separate locations 29 (two shown) around the periphery of the housing. The engagement of the deformed material 29 of the housing 20 in the second groove 398 of the bushing 390 further axially secures the bushing in the housing.

Furthermore, because of the interference fit (and crimped housing), the terminal end portions 31, 32 of the housing 20 may be formed as plain cylindrical tube ends without the need for any further modification (i.e., machining, tapering, forming, etc.). The interference fit is typically provided by the outside diameter of the bushing 390 being nominally about 0.2 mm larger than the inside diameter of the housing 20.

The first section 391 of the bushing 390 further includes a cylindrical recess 393 for receiving the first seal member 370 and part of the sleeve 420. The first recess 393 is defined by a cylindrical sealing surface 399 and a radially extending, annular support surface 395.

The sleeve 420 is preferably clipped onto the inner surface 392 of the bushing 390 to form a single unitary part with the bushing. The sleeve 420 supports the rack 40 for sliding movement relative to the housing 20 and the bushing 390. The sleeve 420 further provides a bearing surface between the axially moving rack 40 and the stationary bushing 390 and reduces wear between the relatively moving parts. The sleeve 420 may be made of a polymer composite material such as 35% glass-filled polyester (RYNITE brand polyester or KEVLAR/TEFLON, both available from E.I. DuPont de Nemours & Co.).

The sleeve 420 is generally cylindrical in shape with a first end portion 421 and an axially opposite second end portion 422. The first end portion 421 has a radially extending flange 424. The flange 424 has an annular first surface 426 and an annular second surface 428 opposite the first surface. As viewed in FIG. 5, the second end portion 422 of the sleeve 420 has a first radially extending tab 431 and a second radially extending tab 432 located at a diametrically opposite location from the first tab.

The first tab 431 has a radially extending first surface 441 (FIG. 4) and an axially and radially extending (or angled)

second end surface 442 spaced axially away from the first surface. The second tab 432 has a radially extending first surface 451 and an axially and radially extending (or angled) second end surface 452 spaced axially away from the first surface.

During assembly, the sleeve 420 is inserted into the bushing 390. The tabs 431, 432 deflect radially inward as the sleeve 420 axially moves relative to the bushing 390. The sleeve 420 is inserted into the first section 391 and moved axially toward the second section 412 until the tabs 431, 432 reach the second section and can be received in corresponding slots 418 in the bushing 390. The tabs 431, 432 snap radially outwardly into the slots 418 in the bushing 390. The tabs 431, 432 and the slots 418 are sized so that the tabs fit snugly into the slots. The manufacturing tolerances between the tabs 431, 432 and the slots 418 are on the order of 0.005–0.010 inches.

The angled surfaces 442, 452 of the tabs 431, 432 facilitate the insertion of the sleeve 420 into the bushing 390 and the axial movement of the sleeve 420 through the bushing 390. The angled surfaces 442, 452 initially engage the support surface 395 of the bushing 390. The support surface 395 cams the tabs 431, 432 radially inward as the sleeve 420 is inserted into the bushing 390. To either side of the tabs 431, 432 are axial slots 433 that further facilitate the radial deflection of the tabs during insertion of the sleeve 420 into the bushing 390.

The sleeve 420 is preferably dimensioned so that the second surface 428 of the flange 424 of the sleeve abuttingly (or axially) engages the support surface 395 of the bushing 390 simultaneously with the tabs 431, 432 snapping into the slots 418 in the bushing. The distance between the first surface 428 of the flange 424 and the first surfaces 441, 451 of the tabs 431, 432 is equal to the distance between the support surface 395 of the bushing 390 and the slots 418 of the bushing.

The sleeve 420 is thus axially secured and located relative to the bushing 390 by the second surface 428 of the flange 424 and the first surfaces 441, 451 of the tabs 431, 432 of the sleeve. Additionally, the sleeve 420 is rotationally secured to, and positioned, relative to the bushing 390 by the tabs 431, 432 that fit tightly within the slots 418 of the bushing.

The fluid tight first seal member 370 is attached to the first section 391 of the bushing 390 and provides a fluid tight seal for the fluid chamber 39 of the housing 20. The first seal member 370 is typically made of an elastomeric material, such as VITON® or hydrogenated NITRILE®. The first seal member 370 includes a cylindrical inner sealing surface 372. The inner surface 372 of the first seal member 370 sealingly engages the outer surface 46 of the rack 40, which is axially movable relative to the seal member.

The first seal member 370 further has first and second surfaces 374, 376, respectively. The first surface 374 is cylindrical and sealingly engages the cylindrical sealing surface 399 of the first recess 393. The second surface 376 extends radially and is annular. The second surface 376 abuts the annular first surface 426 of the flange 424 of the sleeve 420. Fluid pressure from the chamber 39 helps maintain the first seal member 370 in abutting (or axial) engagement with the flange 424 of the sleeve 420 during operation of the steering apparatus 10.

The first seal member 370 may further include an annular groove 378 in which a metallic garter spring 379 is located. The garter spring 379 exerts a radially inward force on a portion of the first seal member 370 to force the inner surface 372 of the first seal member against the outer surface 46 of the rack 40 and maintain a fluid tight seal between the first seal member and the intermittently moving rack.

The first and second sections 391, 412 of the bushing 390 are formed together as one piece, meaning that the first and second sections are made of a single homogeneous material as a single unit, rather than as separate parts that are joined together.

The second section 412 of the bushing 390 projects axially beyond the end surface 30 of the housing 20. The second section 412 includes an annular surface 413 that acts as a bushing-positioning surface. The surface 413 abuts the end surface 30 of the housing 20 and thereby determines the position of the bushing 390 relative to the housing 20. The second section 412 further has a cylindrical outer surface 415 having a diameter substantially equal to the diameter of the outer surface 28 of the terminal end 31 of the housing 20. The second section 412 of the bushing 390 includes a circumferentially extending, annular retaining ridge 414 (FIG. 4) for receiving the bellows member 200, as described above. The retaining ridge 414 extends radially from the outer surface 415 and has a semi-cylindrical shape in cross-section. The retaining ridge 414 is formed as a single-piece with the bushing 390.

The second seal member 380 may be an O-ring located in the annular first groove 396 in the outer surface 394 of the first section 391 of the bushing 390. The second seal member 380 sealingly engages surfaces defining the first groove 396 and the inner surface 26 of the housing 20 to block fluid flow out of the chamber 39 along the inner surface of the housing. The O-ring may be made of neoprene or any other suitable material.

Figure 7:
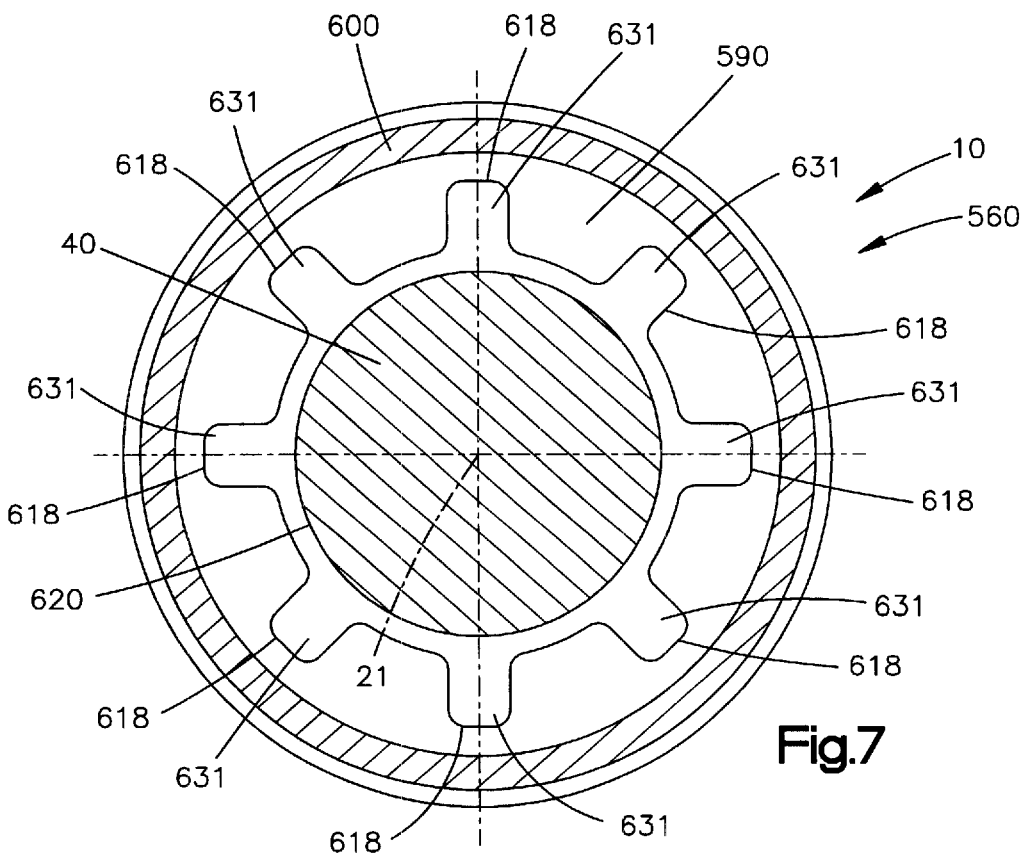
FIG. 7 is a view taken along line 7—7 in FIG. 6.
Figure 6:
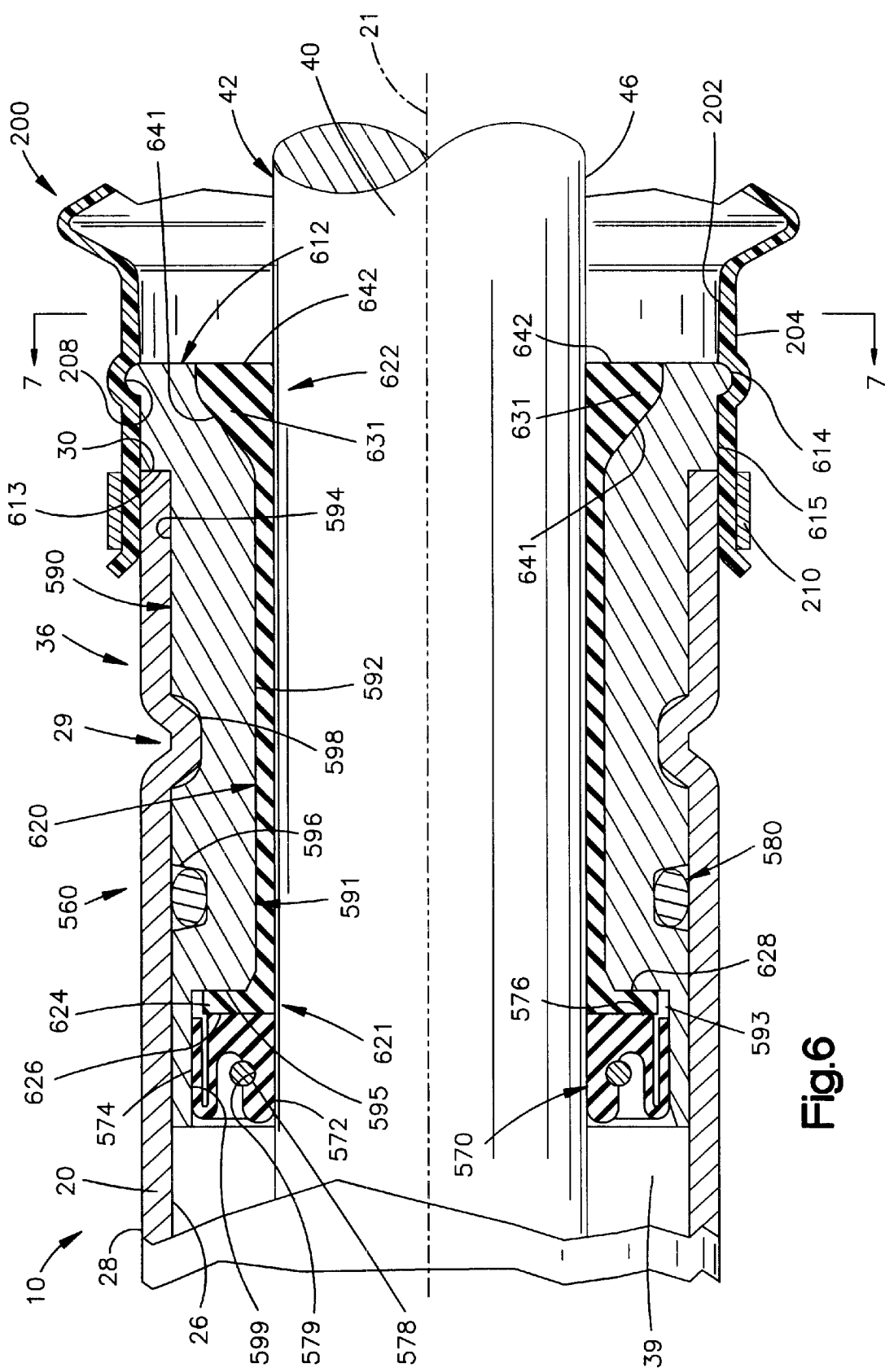
FIG. 6 is an enlarged sectional view of a portion of the power steering apparatus of FIG. 1 illustrating a bushing assembly constructed in accordance with still another feature of the present invention.

FIGS. 6 and 7 illustrate a bushing assembly 560 in accordance with still another feature of the present invention. The bushing assembly 560 is located at the first terminal end 36 of the housing 20. A similar bushing assembly (not shown) may be located at the second terminal end portion 32 of the housing 20. The bushing assembly 560 encircles the rack 40 and is centered on the axis 21. The bushing assembly 560 is connected to the housing 20 and supports the rack 40 for axial movement relative to the housing. The bushing assembly 560 further seals the fluid chamber 39 against the fluid leaking out of the housing 20. The bushing assembly 560 comprises a first annular seal member 570, a second annular seal member 580, an annular bushing 590, and a cylindrical liner, or sleeve 620.

The bushing 590 is located in the fluid chamber 39 and extends radially between the housing 20 and the sleeve 620. The bushing 590 may be made of a metallic material, such as zinc, a zinc alloy (i.e., ZAMAK 5), a powdered metal, or cast aluminum. The bushing 590 extends axially from the end surface 30 of the housing 20 into the fluid chamber 39 in one axial direction and extends axially from the end surface of the housing outwardly along the distal end 42 of the rack 40 in an opposite axial direction. The bushing 590 encircles the outer surface 46 of the rack 40, but does not engage the outer surface 46. The bushing 590 includes cylindrical inner and outer surfaces 592, 594, respectively. Thus, the inner surface 592 of the bushing 590 does not engage, and is spaced radially from, the outer surface 46 of the rack 40.

The bushing 590 further has a first section 591 and an axially opposite second section 612. The first section 591 extends axially along the inner surface 26 of the housing 20 from the end surface 30 of the housing. The first section 591 of the bushing 390 may be secured in the housing 20 by an interference fit between the outer surface 594 of the bushing 590 and the inner surface 26 of the housing. The first section 591 of the bushing 590 defines an axial end of the fluid chamber 39.

The bushing 590 may include two annular recesses, or grooves 596, 598, formed on the outer surface 594 of the bushing 590. The first groove 596 is located in the first section 591 of the bushing 590 and the second groove 598 is located in the first section of the bushing. The grooves 596, 598 extend circumferentially around the outer periphery of the bushing 590.

The interference fit may allow the bushing assembly 560 to be secured to the housing 20 without the necessity of other locking features (i.e., lock wire, locking ring, etc.). However, as viewed in FIG. 6, the bushing assembly 560 may be supplementally secured in the housing 20 by crimping the housing 20. Specifically, the material of the housing 20 may be deformed radially inward for securing the bushing 590 in the housing.

The material of the housing 20 is crimped radially inward into the second groove 598 in the first section 591 of the bushing 590, at separate locations 29 (two shown) around the periphery of the housing. The engagement of the deformed material 29 of the housing 20 in the second groove 598 of the bushing 590 further axially secures the bushing in the housing.

Furthermore, because of the interference fit (and crimped housing), the terminal end portions 31, 32 of the housing 20 may be formed as plain cylindrical tube ends without the need for any further modification (i.e., machining, tapering, forming, etc.). The interference fit is typically provided by the outside diameter of the bushing 590 being nominally about 0.2 mm larger than the inside diameter of the housing 20.

The first section 591 of the bushing 590 further includes a cylindrical recess 593 for receiving the first seal member 570 and part of the sleeve 620. The first recess 593 is defined by a cylindrical sealing surface 599 and a radially extending, annular support surface 595.

The sleeve 620 is preferably molded onto the inner surface 592 of the bushing 590 to form a single unitary part with the bushing. The sleeve 620 supports the rack 40 for sliding movement relative to the housing 20 and the bushing 590. The sleeve 620 further provides a bearing surface between the axially moving rack 40 and the relatively stationary bushing 590 thereby reducing wear between the relatively moving parts. The sleeve 620 may be made of a polymer composite material such as 35% glass-filled polyester (RYNITE brand polyester or KEVLAR/TEFLON, both available from E.I. DuPont de Nemours & Co.).

The sleeve 620 is generally cylindrical in shape with a first end portion 621 and an axially opposite second end portion 622. The first end portion 621 has a radially extending flange 624. The flange 624 has an annular first surface 626 and an annular second surface 628 opposite the first surface. As viewed in FIG. 7, the second end portion 622 of the sleeve 620 has a plurality (eight in FIG. 7) of radially extending tabs 631 with pairs (four shown) of tabs located at diametrically opposite locations from each other.

The tabs 631 have axially and radially extending (or angled) first surfaces 641 and radially extending second surfaces 642 extending perpendicularly to the axis 21. The second surfaces 642 form part of the terminal end surface of the sleeve 620. Material for the sleeve 620 is molded onto the inner surface 592 of the bushing 590 and the support surface 595 of the bushing. Material for the sleeve 620 during molding fills a plurality of slots 618 (FIG. 7) extending radially away from the inner surface of the bushing. The sleeve 620 is thus dimensioned by the shape of the bushing 590 so that the flange 624 of the sleeve is formed on the support surface 595 of the bushing 590 and the tabs 631 are formed in the slots 618 in the bushing.

The slots 618 thus determine the shapes of the tabs 631 when the sleeve 620 is molded. The sleeve 620 is thereby axially secured and positioned relative to the bushing 590 by the second surface 628 of the flange 624 of the sleeve and the first surfaces 641 of the tabs 631 of the sleeve. Additionally, the sleeve 620 is rotationally secured and positioned relative to the bushing 590 by the tabs 631 which fill the slots 618 of the bushing.

The fluid tight first seal member 570 is attached to the first section 591 of the bushing 590 and provides a fluid tight seal for the fluid chamber 39 of the housing 20. The first seal member 570 is typically made of an elastomeric material, such as VITON® or hydrogenated NITRILE®. The first seal member 570 includes a cylindrical inner sealing surface 572. The inner surface 572 of the first seal member 570 sealingly engages the outer surface 46 of the rack 40, which is axially movable relative to the seal member.

The first seal member 570 further has first and second surfaces 574, 576, respectively. The cylindrical first surface 574 sealingly engages the cylindrical sealing surface 599 of the first recess 593. The annular second surface 576 abuts the annular first surface 526 of the flange 524 for axially securing the first seal member 570 (and the flange 624 of the sleeve 620) in the first recess 593. Fluid pressure from the chamber 39 also helps maintain the first seal member 570 in abutting (or axial) engagement with the flange 624 of the sleeve 620 during operation of the steering apparatus 10.

The first seal member 570 may further include an annular groove 578 in which a metallic garter spring 579 is located. The garter spring 579 exerts a radially inward force on a portion of the first seal member 570 to force the inner surface 572 of the first seal member against the outer surface 46 of the rack 40 and maintain a fluid tight seal between the first seal member and the intermittently moving rack.

The first and second sections 591, 612 of the bushing 590 are formed together as one piece, meaning that the first and second sections are made of a single homogeneous material as a single unit, rather than as separate parts that are joined together.

The second section 612 of the bushing 590 projects axially beyond the end surface 30 of the housing 20. The second section 612 includes an annular surface 613 that acts as a bushing-positioning surface. The surface 613 abuts the end surface 30 of the housing 20 and thereby determines the position of the bushing 590 relative to the housing 20. The second section 612 further has a cylindrical outer surface 615 having a diameter substantially equal to the diameter of the outer surface 28 of the terminal end 31 of the housing 20. The second section 612 of the bushing 590 includes a circumferentially extending, annular retaining ridge 614 (FIG. 6) for receiving the bellows member 200, as described above. The retaining ridge 614 extends radially from the outer surface 615 and has a semi-cylindrical shape in cross-section. The retaining ridge 614 is typically formed as a single-piece with the bushing 590.

The second seal member 580 may be an O-ring located in the annular first groove 596 in the outer surface 594 of the first section 591 of the bushing 590. The second seal member 580 sealingly engages the first groove 596 and the inner surface 26 of the housing 20 to block fluid flow out of the chamber 39 along the inner surface of the housing. The O-ring may be neoprene or other suitable material.

From the above description of the invention, those skilled in the art will perceive improvements, changes and modifications. Such improvements, changes and modifications within the skill of the art are intended to be covered by the appended claims.

Having described the invention, we claim:

1. A fluid power assisted rack and pinion steering apparatus for a vehicle, said apparatus comprising:
   a rack connectable with steerable wheels of the vehicle, said rack having a longitudinal axis and being movable in opposite axial directions to turn the steerable wheels in opposite directions;
   a housing partially enclosing said rack and defining a fluid chamber;
   a bushing encircling said rack and having opposite axial ends, said bushing being secured in said housing by an interference fit between an outer surface of said bushing and an inner surface of said housing;
   a sleeve supporting said rack for sliding movement relative to said bushing, said sleeve extending between said bushing and said rack and engaging said rack, said sleeve having at least one radially extending tab received in at least one corresponding recess in said bushing, said at least one radially extending tab axially and rotationally locating said sleeve relative to said bushing; and
   a fluid tight seal member for sealing said fluid chamber.

2. The apparatus as set forth in claim 1 wherein said bushing is spaced radially from said rack, said sleeve engaging said bushing and said rack.

3. The apparatus as set forth in claim 1 wherein said housing includes at least one terminal end portion, said terminal end portion having an annular surface for abutting a surface of said bushing and for positioning said bushing relative to said housing.

4. The apparatus as set forth in claim 1 wherein said sleeve includes a radially extending flange for axially securing said sleeve to said bushing.

5. The apparatus as set forth in claim 1 wherein said sleeve has tabs that snap onto said bushing during assembly of said sleeve and said bushing.

6. The apparatus as set forth in claim 1 wherein said sleeve is molded onto said bushing prior to assembly of said apparatus.

7. The apparatus as set forth in claim 1 further includes a second fluid tight seal member for sealing said fluid chamber.

8. A fluid power assisted rack and pinion steering apparatus for a vehicle, said apparatus comprising:
   a rack connectable with steerable wheels of the vehicle, said rack having a longitudinal axis and being movable in opposite axial directions to turn the steerable wheels in opposite directions;
   a housing partially enclosing said rack and defining a fluid chamber, said housing having at least one terminal end portion with a cylindrical inner surface having a constant inner diameter;
   a bushing encircling said rack, said bushing having an outer surface engaging said inner surface of said housing, said bushing having a first end portion and a second axially opposite second end portion;
   a sleeve supporting said rack for sliding movement relative to said bushing, said sleeve having at least one radially extending tab for receipt in at least one corresponding recess at said second end portion of said bushing, said at least one radially extending tab both axially and rotationally securing said sleeve to said bushing; and
   a fluid tight seal member for sealing said fluid chamber, said seal member being located in a recess at said first end portion of said bushing.

9. The apparatus as set forth in claim 8 wherein said bushing includes a retaining ridge for securing a bellows member to said bushing, said retaining ridge being formed as one-piece with said bushing.

10. The apparatus as set forth in claim 8 wherein said sleeve is made from a polymer material.

11. The apparatus as set forth in claim 10 wherein said bushing is made from a metallic material.

* * * * *